(12) United States Patent
Dieringer

(10) Patent No.: US 6,837,408 B2
(45) Date of Patent: Jan. 4, 2005

(54) DRINKS HOLDER

(75) Inventor: Juergen Dieringer, Herrenzimmmern (DE)

(73) Assignee: fischerwerke Artur Fischer GmbH & Co. KG, Waldachtal (DE)

( * ) Notice: Subject to any disclaimer, the term of this patent is extended or adjusted under 35 U.S.C. 154(b) by 100 days.

(21) Appl. No.: 10/257,890

(22) PCT Filed: Jan. 31, 2002

(86) PCT No.: PCT/EP02/00984
§ 371 (c)(1),
(2), (4) Date: Oct. 17, 2002

(87) PCT Pub. No.: WO02/068239
PCT Pub. Date: Sep. 6, 2002

(65) Prior Publication Data
US 2003/0075660 A1 Apr. 24, 2003

(30) Foreign Application Priority Data
Feb. 24, 2001 (DE) .......................... 101 09 119

(51) Int. Cl.$^7$ ................................ B60R 7/06
(52) U.S. Cl. ............ 224/483; 224/281; 224/549; 224/926; 248/311.2; 296/37.8; 296/37.12
(58) Field of Search ............... 224/483, 281, 224/543, 544, 548, 549, 926; 296/37.8, 37.12; 248/311.2

(56) References Cited
U.S. PATENT DOCUMENTS 4,981,277 A * 1/1991 Elwell .................... 248/311.2
5,259,580 A * 11/1993 Anderson et al. ......... 248/311.2
5,284,314 A * 2/1994 Misaras et al. .......... 248/311.2
5,505,417 A   4/1996 Plocher
5,527,008 A * 6/1996 Schutter et al. .......... 248/311.2
5,692,658 A * 12/1997 Fischer et al. ............. 224/281
5,692,718 A * 12/1997 Bieck ...................... 248/311.2
5,876,007 A * 3/1999 Lancaster et al. ........ 248/311.2
5,881,935 A   3/1999 Hamamoto et al.
5,944,240 A * 8/1999 Honma ....................... 224/281
6,076,793 A * 6/2000 Yamamoto ............... 248/311.2
6,464,187 B1 * 10/2002 Bieck et al. ............. 248/311.2

* cited by examiner

Primary Examiner—Stephen K. Cronin
(74) Attorney, Agent, or Firm—Michael J. Striker

(57) ABSTRACT

The invention relates to a drinks holder (10) intended for installation in a dashboard of a motor vehicle. The drinks holder (10) has a pull-out part (14), which is so guided as to be displaceable in the manner of a drawer and which is provided with insertion openings (32) for inserting drinks containers such as, for example, drinks cans, beakers or cups. The invention proposes providing, at the rear of the pull-out part (14), a pivotal part (22) capable of pivoting downwards, which, when the pull-out part (14) is pushed into a housing (12), pivots downwards so that the length of the pull-out part (14) in the direction of displacement is reduced. The invention makes possible a drinks holder (10) housing (12) of short dimensions, which in the direction of displacement can be shorter than the diameter of the insertion openings (32).

6 Claims, 4 Drawing Sheets

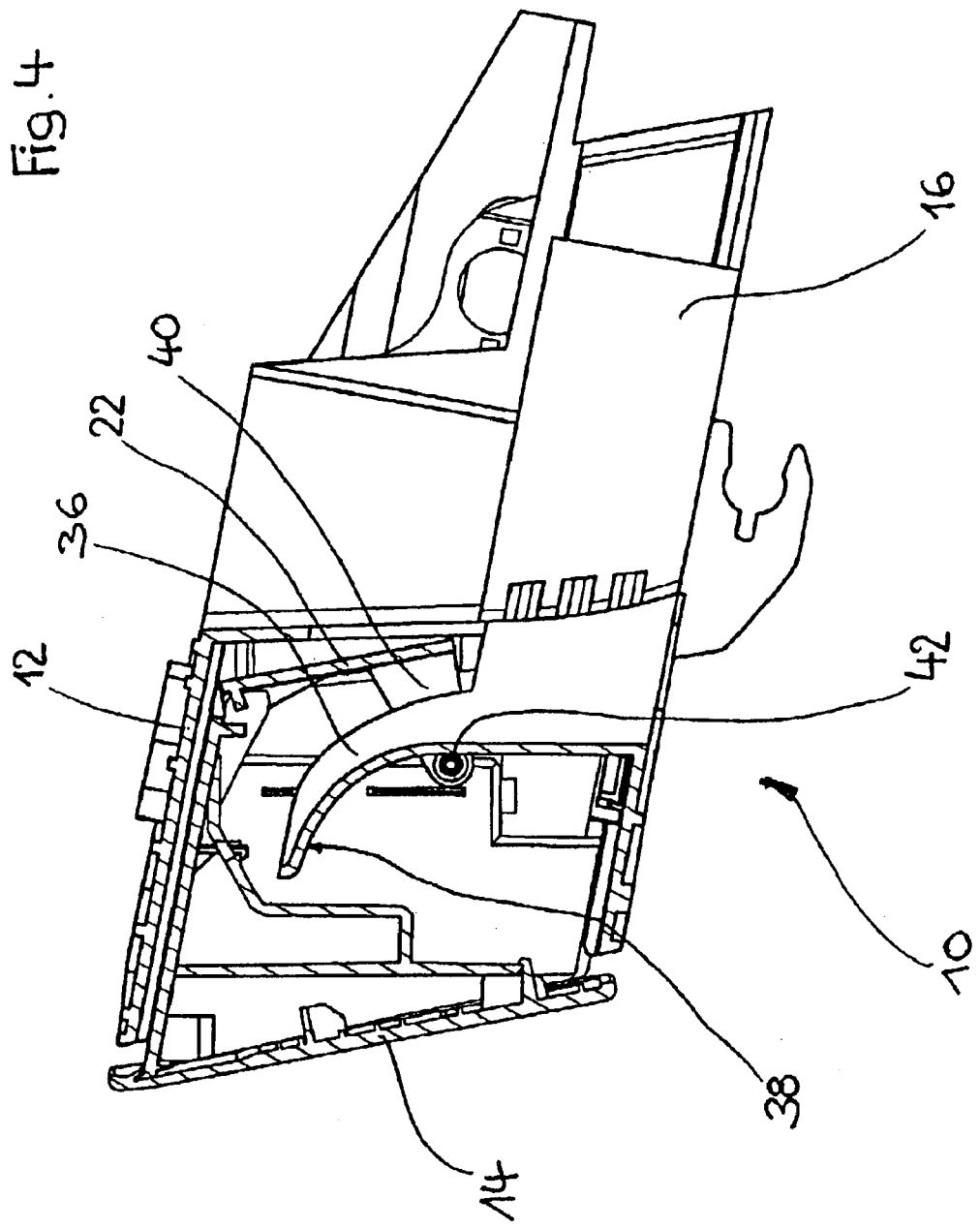

DRINKS HOLDER

BACKGROUND OF INVENTION

The invention relates to a drinks holder which is intended for installation in a motor vehicle.

Such drinks holders are known per se. They are intended for installation retracted into a dashboard of a motor vehicle and have a pull-out part, which is so guided as to be displaceable in the manner of a drawer and which is provided with one or two insertion openings for inserting one or two drinks containers. Drinks containers are, for example, beakers, drinks cans or cups. The pull-out part is displaceable back and forth between a pushed-in, non-use position and a pulled-out, use position. In the pushed-in, non-use position, the pull-out part is retracted into the dashboard and, especially by means of a panel, shuts away flush with a surface of the dashboard. In the pulled-out, use position, the pull-out part so projects out from the dashboard that a drinks container can be inserted into the insertion opening of the pull-out part.

Installation of the known drinks holders can be problematic when the depth of available installation space in the dashboard is too little for the pull-out part of the drinks holder. The depth of the installation space is understood to mean its dimension in the direction of displacement of the pull-out part of the drinks holder.

SUMMARY OF THE INVENTION

The problem underlying the invention is accordingly to provide a drinks holder of the kind mentioned at the beginning that can be installed in an installation space of little depth in the direction of displacement of the pull-out part of the drinks holder.

The problem is solved according to the present invention. The pull-out part of the drinks holder according to the present invention has a pivotal part, which is arranged at the rear of the pull-out part, seen in the pull-out direction of the pull-out part. The pivotal part forms part of the insertion opening of the pull-out part, in the region of the rear of the pull-out part. The pivotal part is, by means of a pivot mounting, so mounted on the pull-out part that it can pivot downwards. When not In use, the pivotal part can be pivoted downwards and, as a result, the length of the pull-out part, Including the pivotal part, can be reduced in the direction of displacement of the pull-out part. Pivoting the pivotal part downward makes it possible for the pull-out part to be reduced to a length, in the direction of displacement, which can be shorter than the diameter of the insertion opening. As a result, in the pushed-in, non-use position, the pull-out part of the drinks holder according to the invention requires only a small amount of installation space in the direction of displacement of the pull-out part. The invention accordingly has the advantage that the drinks holder can be installed in an installation space of little depth in the direction of displacement of the pull-out part of the drinks holder. The depth of the installation space can, in embodiments of the invention, be less then the diameter of an insertion opening for a drinks container In the drinks holder, or in its pull-out part.

In a preferred embodiment of the invention, the drinks holder has a drive for the pivotal part, which drive pivots the pivotal part downwards when the pull-out part is pushed in, into the non-use position, and/or pivots the pivotal part upwards when the pull-out part is pulled out, into the use position. The drive is preferably in the form of a mechanical drive which derives the pivoting movement of the pivotal part from the displacement movement of the pull-out part.

In an embodiment of the invention, the drive has a fixedly located hook element and a counterpart element arranged on the pivotal part. When the pull-out part is pushed in from the use position to the non-use position, the counterpart element comes into contact with the fixedly located hook element. The hook element forms a control track, along which the counterpart element of the pivotal part slides when the pull-out part is being pushed in and which, as a result, pivots the pivotal part downwards.

In an embodiment of the invention, the upwards pivoting movement of the pivotal part is spring-actuated by means of a spring element.

The pivot mounting is especially in the form of a pivotal joint having a pivot axis running horizontally or approximately horizontally and transversely or approximately transversely to the direction of displacement of the pull-out part. A pivotal joint is a means of providing a pivot mounting that is simple, reasonably priced and, in addition, capable of stable construction.

BRIEF DESCRIPTION OF THE DRAWINGS

The invention is described below in greater detail with reference to an exemplary embodiment illustrated in the drawing, in which:

FIG. 4 shows the drinks holder of FIG. 1 in a pushed-in, non-use position, in a longitudinal section corresponding to FIG. 3.

DETAILED DESCRIPTION OF THE PREFERRED EMBODIMENTS

Figure 1:
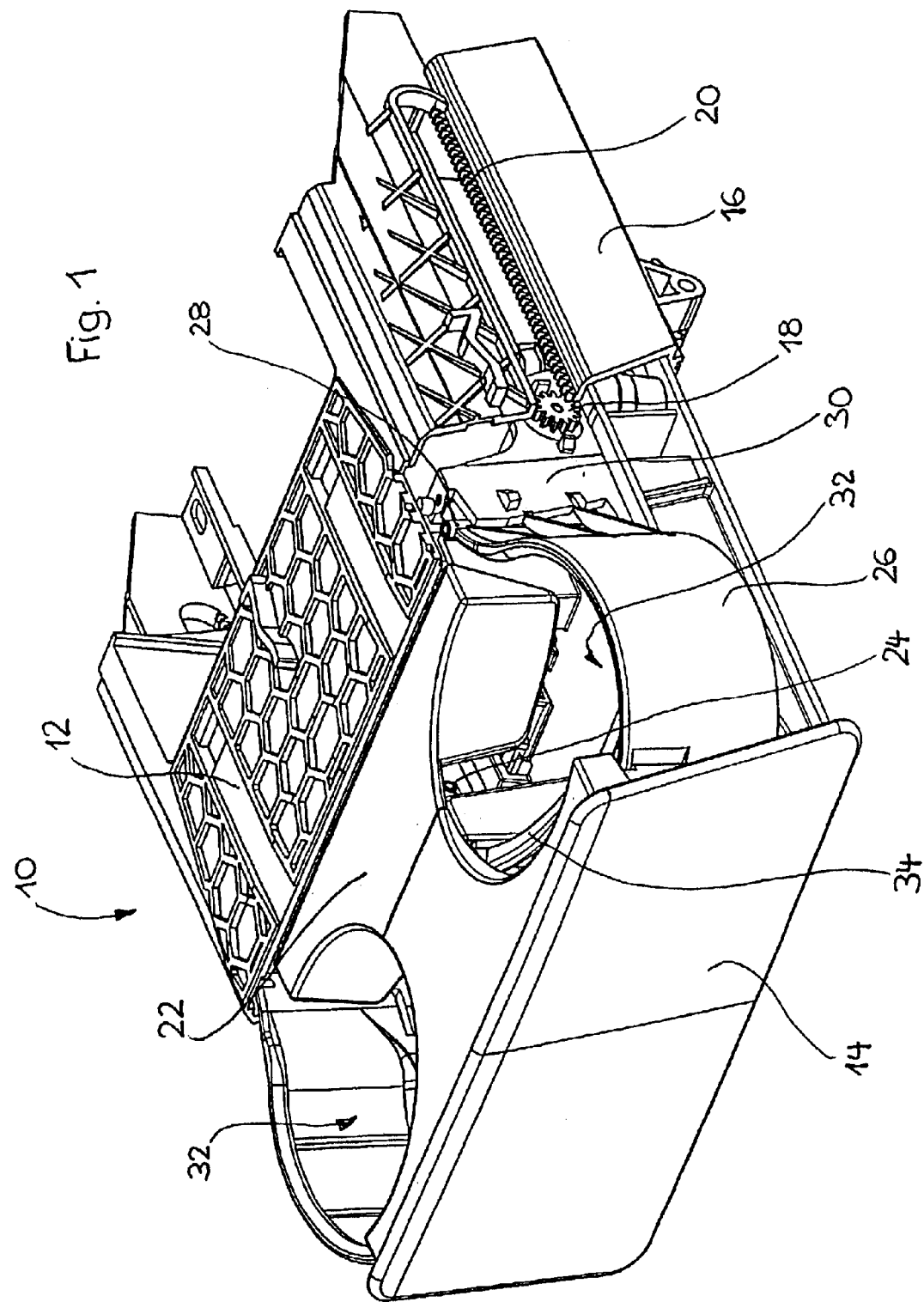
FIG. 1 shows a drinks holder according to the invention in a perspective view, in a pulled-out, use position.
Figure 2:
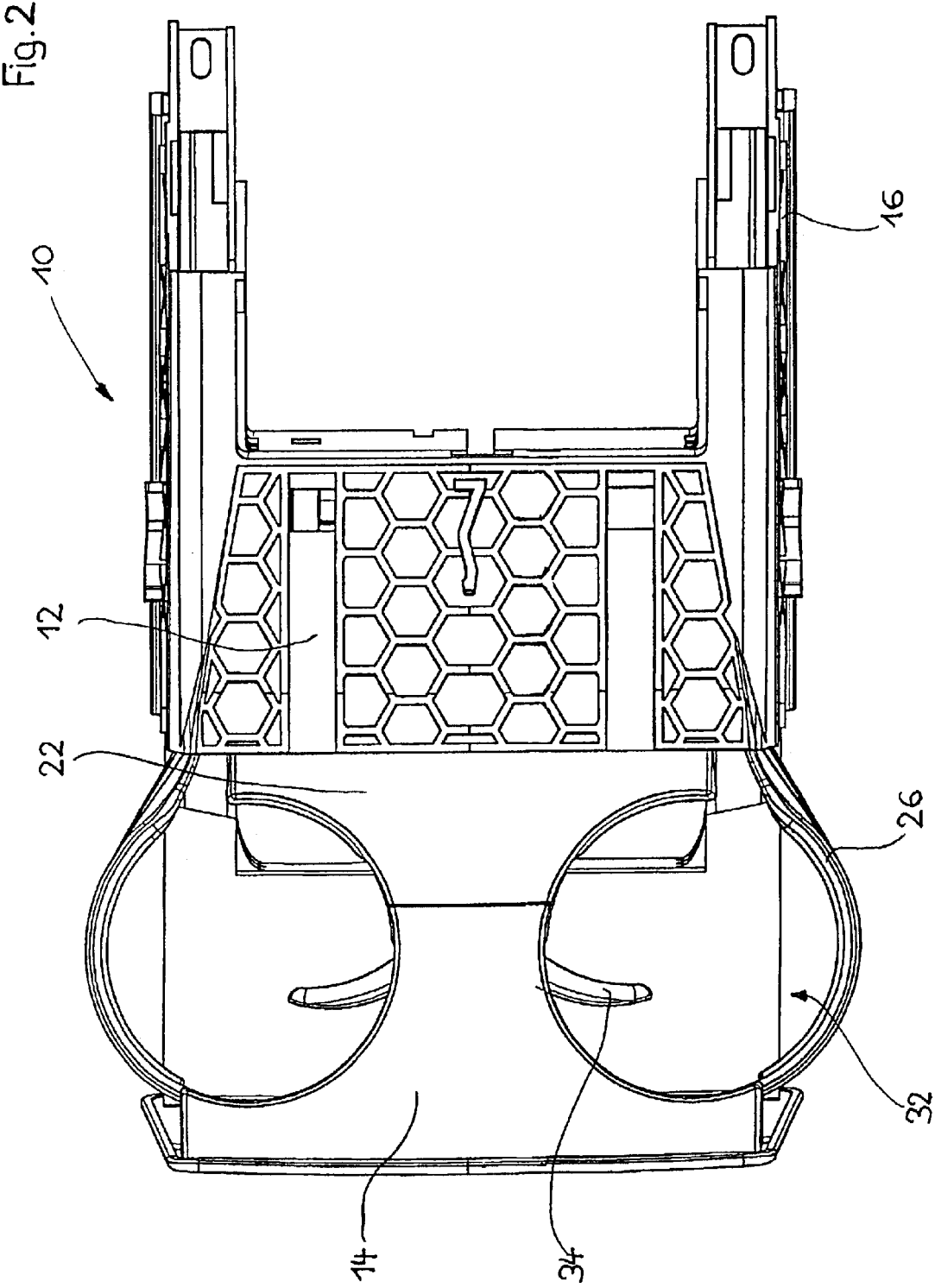
FIG. 2 shows the drinks holder of FIG. 1 in a top view.
Figure 3:
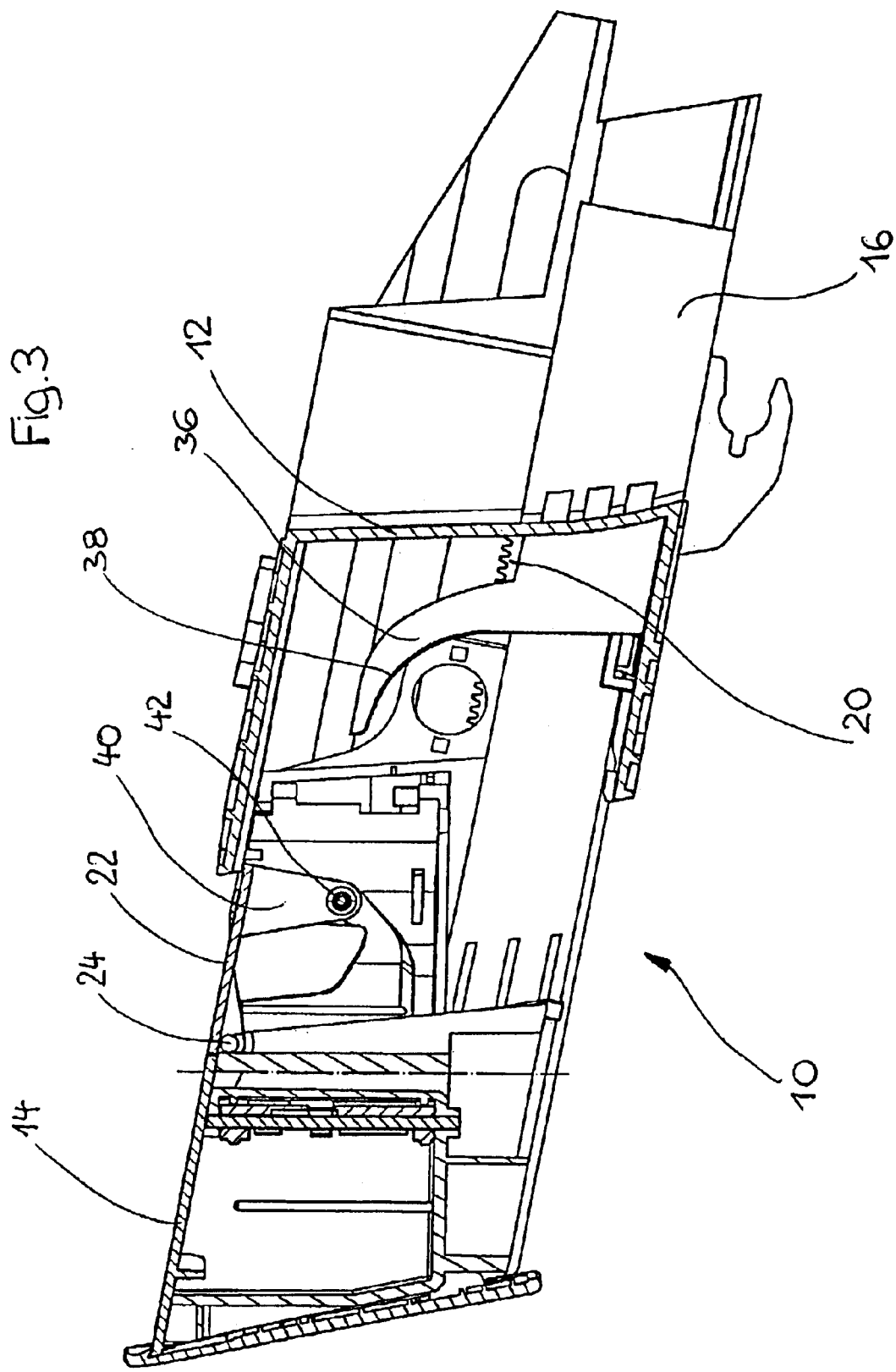
FIG. 3 show the drinks holder of FIG. 1 in longitudinal section.

The drinks holder 10 according to the invention shown in the drawing has a box-shaped housing 12, which is open to the front. Inside the housing 12, a pull-out part 14 is so arranged as to be displaceable in the manner of a drawer. As a slide guideway for the pull-out part 14, the drinks holder 10 has guide rails 16, which are arranged at the sides of the housing 12 and in which the pull-out part 14 is displaceably located. The guide rails 16 project beyond the rear of the housing 12; the housing 12 is shorter than the guide rails 16 in the direction of displacement of the pull-out part 14. By means of the slide guideway, the pull-out part 14 is so guided as to be displaceable back and forth between a use position (shown in FIGS. 1–3) pulled out from the housing 12 and a non-use position (shown in FIG. 4) pushed into the housing 12. In the pulled-out, use position, the pull-out part 14 projects out from the open front of the housing 12.

For displacement of the pull-out part 14 out from the housing 12 into the use position, the drinks holder 10 has a scroll spring (not shown in the drawing). The scroll spring is known per se, being a metal strip that rolls up of its own accord by virtue of its spring resilience. The scroll spring is accordingly a tension spring element. A coil of the scroll spring is rotatably arranged at the rear of the pull-out part 14; the free end of the roll spring is fastened to the base of the housing 12, close to the opening at the front. By virtue of its tensional spring force, the scroll spring moves the pull-out part 14 into the pulled-out, use position projecting out from the housing 12.

The displacement movement of the pull-out part 14 is dumped by means of two rotary dampers 18, which are located in gaps in lateral walls of the pull-out part 14 and the toothed wheels of which mesh with toothed racks 20 fixed in the housing, which are provided on upper faces of the guide rails 16.

The pull-out part 14 is held in the non-use position pushed into the housing 12 by a releasable locking device (not shown in the drawing). Such locking devices will be known to the person skilled in the art as, for example, so-called push-push locking mechanisms or cardioid locking devices, which can be unlocked by pushing a little, from the front, on the pull-out part 14 pushed into the housing 12. After unlocking, the scroll spring described earlier moves the pull-out part 14 into the use position projecting out from the housing 12.

At its rear, the pull-out part 14 of the drinks holder 10 according to the invention has a pivotal part 22. The rear is understood to mean that face of the pull-out part 14 which is at the back in the pull-out direction and which faces the housing 12 in the pulled-out, use position. The pivotal part 22 is so mounted on the pull-out part 14, by means of a pivotal joint 24, that it can pivot downwards. The pivotal joint 24 has a horizontal pivot axis extending transversely to the direction of displacement of the pull-out part 14. A leg spring (not shown in the drawing) arranged at the pivotal joint 24 urges the pivotal part 22 into the horizontal position shown in FIGS. 1–3.

On both sides, the pull-out part 14 has holding arms 26, which are arcuately curved outwards in a lateral direction and which are so mounted that they can pivot about hinges 28 having vertical pivot axes. The holding elements 26 are urged outwards under spring bias. When the pull-out part 14 is pushed into the housing 12, lateral walls 30 of the housing press the holding arms 26 inwards. Such spring-biased holding arms 26 on drinks holders are known per se and will not be further described herein since they do not constitute the actual subject-matter of the invention. The pull-out part 14 has two insertion openings 32 arranged next to one another for inserting drinks containers (not shown) such as, for example, drinks cans, beakers or cups. The insertion openings 32 are surrounded, and formed, over part of their periphery, by holes in the pull-out part 14 which are shaped in the form of an arc of a circle, in a rear region by the pivotal part 22, and at the outer faces of the pull-out part 14 by the holding arms 26.

Spring-biased compensating flaps 34 are arranged in the insertion openings 32, which flaps 34 are so mounted in the pull-out part 14 that they can pivot about vertical pivot axes. The compensating flaps 34 are urged under spring bias into the insertion openings 32 and match the size of the insertion openings 32 to various diameters of drinks containers. Such compensating flaps 34 on drinks holders are known per se and, because they do not constitute the actual subject-matter of the invention, will not be further described herein.

A fixedly located, arcuate hook element 36 is arranged in the housing 12. A concave face of the hook element 36 extends in an arc from bottom to top and, at the same time, towards the open front of the housing 12. The concave inner face of the hook element 36 forms a control track 38 for the pivotal part 22.

Two tongues 40 project down, parallel and spaced apart from one another, from the underside of the pivotal part 22. The tongues 40 are arranged at the rear end of the pivotal part 22. The bottom ends of the two tongues 40 are connected to a pin 42, which forms a counterpart element co-operating with the control track 38. The control track 38 and the pin 42 form a drive for the control part: when the pull-out part 14 is being pushed into housing 12, the pin 42 comes into contact with the control track 38 and slides along it. As the pull-out part 14 is pushed further in, the control track 38 guides the pin 42 downwards and, as a result, pivots the pivotal part 40 downwards, against the force of its spring element, into the position shown in FIG. 4. As a result of the fact that the pivotal part 22 is pivoted down when the pull-out part 14 is pushed into the housing 12 into the non-use position shown in FIG. 4, the overall length of the pull-out part 14, including its pivotal part 22, is reduced so that the housing 12 can be of short construction in the direction of displacement of the pull-out part 14. The length of the housing 12 in the direction of displacement of the pull-out part 14 is, in the embodiment of the invention illustrated and described, shorter than the diameter of the insertion openings 32. As a result of the short dimensions of the housing 12 it is possible, for example, for an air channel of a motor vehicle in which the drinks holder 10 is installed to be arranged to pass through, at the rear of the housing 12, between the guide rails 16, which project out towards the rear. As a result of the short housing 12, the drinks holder 10 according to the invention can be accommodated in an installation space of little depth in the direction of displacement of the pull-out part 14.

What is claimed is:

1. A drinks holder, comprising:
   a pull-out part provided with an insertion opening for insertion of a drinks container and having a slide guideway, wherein by means of the guideway, the pull-out part is so guided that the pull-out part is displaceable back and forth, in the manner of a drawer, between a pushed-in, non-use position and a pulled-out, use position, wherein the pull-out part (14) has a pivotal part (22), wherein the pivotal part (22) is arranged at the rear of the pull-out part (14) in the pull-out direction and forms part of the insertion opening (32) in the use position, and wherein the pivotal part has a pivot mounting (24), wherein by means of the pivot mounting, the pivotal part (22) is so mounted on the pull-out part (14) that the pivotal part (22) can be pivoted downwards when not being used, wherein, when the pivotal part is not in use, the length of the pull-out part, including the pivotel part (22), is reduced in a direction of displacement, such that the length of the pull-out part is shorter than a diameter of the insertion opening.

2. The drinks holder according to claim 1, wherein further comprising a drive (38, 42) for the pivotal part (22), wherein said drive pivots the pivotal part (22) downwards when the pull-out part (14) is pushed in, into the non-use position, or pivots the pivotal part (22) upwards when the pull-out part (14) is pulled out, into the use position.

3. The drinks holder according to claim 2, wherein the drive (38, 42) has a control track (38), wherein a counterpart element (42) slides along the control track (38) when the pull-out part (14) is being displaced, the control track (38) being so configured that the pivotal part (22) is pivoted downwards when the pull out part (14) is pushed in, into the non-use position.

4. The drinks holder according to claim 3, wherein the control track (38) is arranged on a fixedly located hook element (36); the counterpart element (42) is arranged on the pivotal part (22); and, when the pull-out part (14) is being pushed in, into the non-use position, the counterpart element (42) comes into contact with the control track (38), slides along it and pivots the pivotal part (22) downwards.

5. The drinks holder according to claim 1, wherein the drinks holder (10) has a spring element, wherein said spring element pivots the pivotal part (22) upwards.

6. The drinks holder according to claim 1, wherein the pivot mounting has a pivotal joint (24) having a pivot axis extending approximately horizontally and approximately transversely to the direction of displacement of the pull-out part (14).

* * * * *